United States Patent
Wang et al.

(10) Patent No.: US 11,128,396 B2
(45) Date of Patent: Sep. 21, 2021

(54) USER TERMINAL, A FEEDBACK METHOD AT THE USER TERMINAL, A BASE STATION AND A METHOD AT THE BASE STATION

(71) Applicant: NTT DOCOMO, INC., Tokyo (JP)

(72) Inventors: Xin Wang, Beijing (CN); Xiaolin Hou, Beijing (CN); Chongning Na, Beijing (CN); Huiling Jiang, Beijing (CN); Yuichi Kakishima, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 212 days.

(21) Appl. No.: 16/470,918

(22) PCT Filed: Jan. 5, 2018

(86) PCT No.: PCT/CN2018/071587
§ 371 (c)(1),
(2) Date: Jun. 18, 2019

(87) PCT Pub. No.: WO2018/127134
PCT Pub. Date: Jul. 12, 2018

(65) Prior Publication Data
US 2020/0092037 A1    Mar. 19, 2020

(30) Foreign Application Priority Data

Jan. 6, 2017 (CN) .......................... 201710011432.6

(51) Int. Cl.
*H04W 4/00* (2018.01)
*H04L 1/00* (2006.01)
(Continued)

(52) U.S. Cl.
CPC .......... *H04L 1/0026* (2013.01); *H04L 1/1812* (2013.01); *H04L 1/1861* (2013.01); *H04L 5/0055* (2013.01); *H04W 72/042* (2013.01)

(58) Field of Classification Search
CPC ... H04L 1/0026; H04L 1/0023; H04L 5/0057; H04L 1/0009; H04L 1/0003; H04W 72/042
See application file for complete search history.

(56) References Cited

U.S. PATENT DOCUMENTS

| 2004/0252663 A1* | 12/2004 | Takano | H04B 7/0613 370/335 |
| 2009/0017850 A1* | 1/2009 | Jovicic | H04B 17/309 455/501 |

(Continued)

*Primary Examiner* — Abdelillah Elmejjarmi
(74) *Attorney, Agent, or Firm* — Osha Bergman Watanabe & Burton LLP

(57) ABSTRACT

Provided are a user terminal, a feedback method at the user terminal, a base station and a method at the base station. The feedback method at the user terminal includes steps of: calculating first information related to receiving signal quality; combining the first information and a response signal to a hybrid automatic repeat request (HARQ) to be transmitted to a base station to generate a combined signal; carrying out signal processing on the combined signal to generate second information; and transmitting the second information to the base station.

13 Claims, 10 Drawing Sheets

(51) Int. Cl.
*H04L 1/18* (2006.01)
*H04L 5/00* (2006.01)
*H04W 72/04* (2009.01)

(56) References Cited

U.S. PATENT DOCUMENTS

| | | | | |
|---|---|---|---|---|
| 2012/0034927 | A1* | 2/2012 | Papasakellariou | H04W 52/32 |
| | | | | 455/450 |
| 2014/0019472 | A1* | 1/2014 | Franke | G06F 16/2282 |
| | | | | 707/769 |
| 2015/0263796 | A1* | 9/2015 | Nam | H04B 7/0452 |
| | | | | 370/329 |

* cited by examiner

200

S201: calculating first information related to receiving signal quality

S202: combining the first information and a response signal of the hybrid automatic repeat request (HARQ) to be transmitted to a base station to generate a combined signal S203: carrying out signal processing on the combined signal to generate the second information S204: transmitting the second information to the base station

FIG. 2

| bit | response signal | bias |
|---|---|---|
| 1 | ACK | 0 or positive (i.e., non-negative) |

| bit | response signal | bias |
|---|---|---|
| 0 | NACK | 0 or negative (i.e., non-positive) |

FIG. 3A

| bit sequence | response signal | bias |
|---|---|---|
| 100 | ACK | 0 |
| 101 | ACK | +1 |
| 110 | ACK | +2 |
| 111 | ACK | +3 |

| bit sequence | response signal | bias |
|---|---|---|
| 000 | NACK | 0 |
| 001 | NACK | -1 |
| 010 | NACK | -2 |
| 011 | NACK | -3 |

FIG. 3B

| bit sequence | response signal | bias |
|---|---|---|
| 0000 | NACK | 0 |
| 1000 | ACK | +1 |
| 1001 | ACK | +2 |
| 1010 | ACK | +3 |
| 1011 | ACK | +4 |
| 1100 | ACK | 0 |
| 1101 | ACK | -1 |
| 1110 | ACK | -2 |
| 1111 | ACK | -3 |

FIG. 3C

| bit sequence | response signal | bias |
|---|---|---|
| 000 | ACK | 0 |
| 100 | ACK | +1 |
| 001 | ACK | +2 |
| 101 | ACK | +3 |

| bit sequence | response signal | bias |
|---|---|---|
| 010 | NACK | 0 |
| 110 | NACK | -1 |
| 011 | NACK | -2 |
| 111 | NACK | -3 |

FIG. 3D

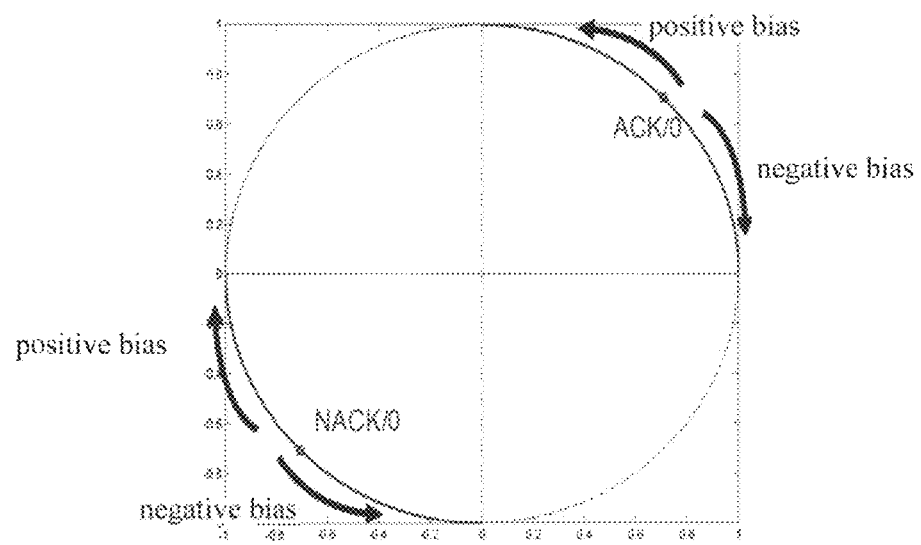
FIG. 5D
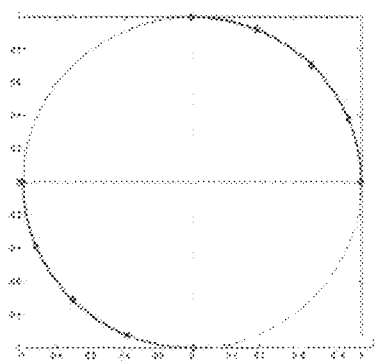
symbol/RE 1
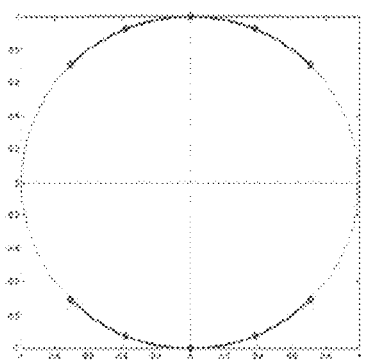
symbol/RE 2
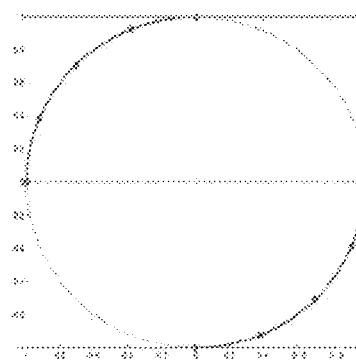
symbol/RE 3
FIG. 6

700 receiving second information from a user terminal,
wherein the second information is obtained by carrying out
the following steps at the user terminal:
calculating first information related to receiving signal quality;
combining the first information and a response signal of
the hybrid automatic repeat request (HARQ) to be received from
the user terminal to generate a combined signal;
carrying out signal processing on the combined signal to
generate the second information

USER TERMINAL, A FEEDBACK METHOD AT THE USER TERMINAL, A BASE STATION AND A METHOD AT THE BASE STATION

CROSS-REFERENCE TO RELATED APPLICATIONS

This patent application is a 371 U.S. National Phase of International Application No. PCT/CN2018/071587, filed on Jan. 5, 2018, which claims priority to Chinese Patent Application No. 201710011432.6 filed on Jan. 6, 2017. The entire disclosures of the above applications are incorporated herein by reference.

TECHNICAL FIELD

The present application relates to a field of wireless communication, and in particular to a user terminal, a feedback method at the user terminal, a base station, and a method at the base station.

BACKGROUND

In a field of wireless communication, a user terminal or wireless terminal, also referred to as a user equipment (UE), communicates with a radio base station (RBS) or a base station (BS) through a wireless network, such as a radio access network (RAN). The radio access network (RAN) covers a geographic area which is typically divided into cell areas, each of which is served by a radio base station.

The user terminal can transmit a specific feedback to the base station to give an indication of channel quality to the base station. When the base station transmits to a plurality of UEs simultaneously by using a multi-user transmission manner, one specific type of feedback is a multi-user-channel quality index (MU-CQI) report (hereinafter referred to as "MU-CQI"). The MU-CQIs may be transmitted periodically or aperiodically by the user terminal. The periodic MU-CQIs may be transmitted on a physical uplink control channel (PUCCH), or a physical uplink shared channel (PUSCH), or on other channels on which uplink data and control information are transmitted. The aperiodic MU-CQIs can be transmitted on the PUSCH.

SUMMARY OF THE INVENTION

According to an aspect of the present disclosure, there is provided a feedback method at a user terminal, comprising steps of: transmitting and receiving a signal with a base station; calculating first information related to receiving signal quality; combining the first information and a response signal to a hybrid automatic repeat request (HARQ) to be transmitted to a base station, to generate a combined signal; carrying out signal processing on the combined signal to generate second information; transmitting the second information to the base station.

According to another aspect of the present disclosure, there is provided a user terminal, comprising: a communication apparatus configured to transmit and receive signals with a base station; a processor configured to calculate first information related to receiving signal quality; combine the first information and a response signal to a hybrid automatic repeat request (HARQ) to be transmitted to a base station to generate a combined signal; and carry out signal processing on the combined signal to generate second information; and a communication apparatus configured to transmit the second information to the base station.

According to another aspect of the present disclosure, there is provided a method at a base station, comprising steps of: receiving second information from a user terminal, wherein the second information is obtained by carrying out the following steps at the user terminal: calculating first information related to receiving signal quality; combining the first information and a response signal to a hybrid automatic repeat request (HARQ) to be received from the user terminal to generate a combined signal; carrying out signal processing on the combined signal to generate the second information.

According to another aspect of the present disclosure, there is provided a base station, comprising: a communication apparatus configured to receive second information from a user terminal, wherein the second information is obtained by carrying out the following steps at the user terminal: calculating first information related to receiving signal quality; combining the first information with a response signal to a hybrid automatic repeat request (HARQ) to be received from the user terminal to generate a combined signal; carrying out signal processing on the combined signal to generate the second information.

BRIEF DESCRIPTION OF THE DRAWINGS

A more detailed understanding of the present invention can be found in the following description given by way of specific examples in conjunction with drawings, in which:

FIG. 2 exemplarily shows a flowchart of a feedback method at a user terminal according to embodiments of the present invention.

FIG. 3A exemplarily shows a first exemplary encoding example in the feedback method at the user terminal according to embodiments of the present invention.

FIG. 3B exemplarily shows a second exemplary encoding example in the feedback method at the user terminal according to embodiments of the present invention.

FIG. 3C exemplarily shows a third exemplary encoding example in the feedback method at the user terminal according to embodiments of the present invention.

FIG. 3D exemplarily shows a fourth exemplary encoding example in the feedback method at the user terminal according to embodiments of the present invention.

FIG. 5D exemplarily shows a fourth constellation mapping example in the feedback method at the user terminal according to embodiments of the present invention.

FIG. 6 exemplarily shows an example of channel coding after constellation modulation in the feedback method at the user terminal according to embodiments of the present invention.

FIG. 7 exemplarily shows a flowchart of a method at a base station according to embodiments of the present invention.

DESCRIPTION OF THE EMBODIMENTS

Specific embodiments of the present invention will now be referred to in detail to illustrate examples of the present invention in drawings. Although the present invention will be described in conjunction with specific embodiments, it will be understood that it is not intended to limit the present invention to the described embodiments. On the contrary, it is intended to cover changes, modifications and equivalents included in the spirit and scope of the present invention and defined by the appended claims. It should be noted that the method steps described herein can be realized by any functional block or functional arrangement, and any functional block or functional arrangement can be realized as a physical entity or a logical entity, or a combination of both.

In order to enable those skilled in the art have a better understanding of the present invention, the present invention is further described in detail below in conjunction with the drawings and specific implementations.

Note that the following example is merely one specific example and does not necessarily limit the embodiments of the present invention to specific shapes, hardware, connection relationships, steps, values, conditions, data, sequences, or the like as shown and described. Those skilled in the art can apply the idea of the present invention to construct more embodiments not mentioned in the specification by reading the present specification.

Figure 1A:
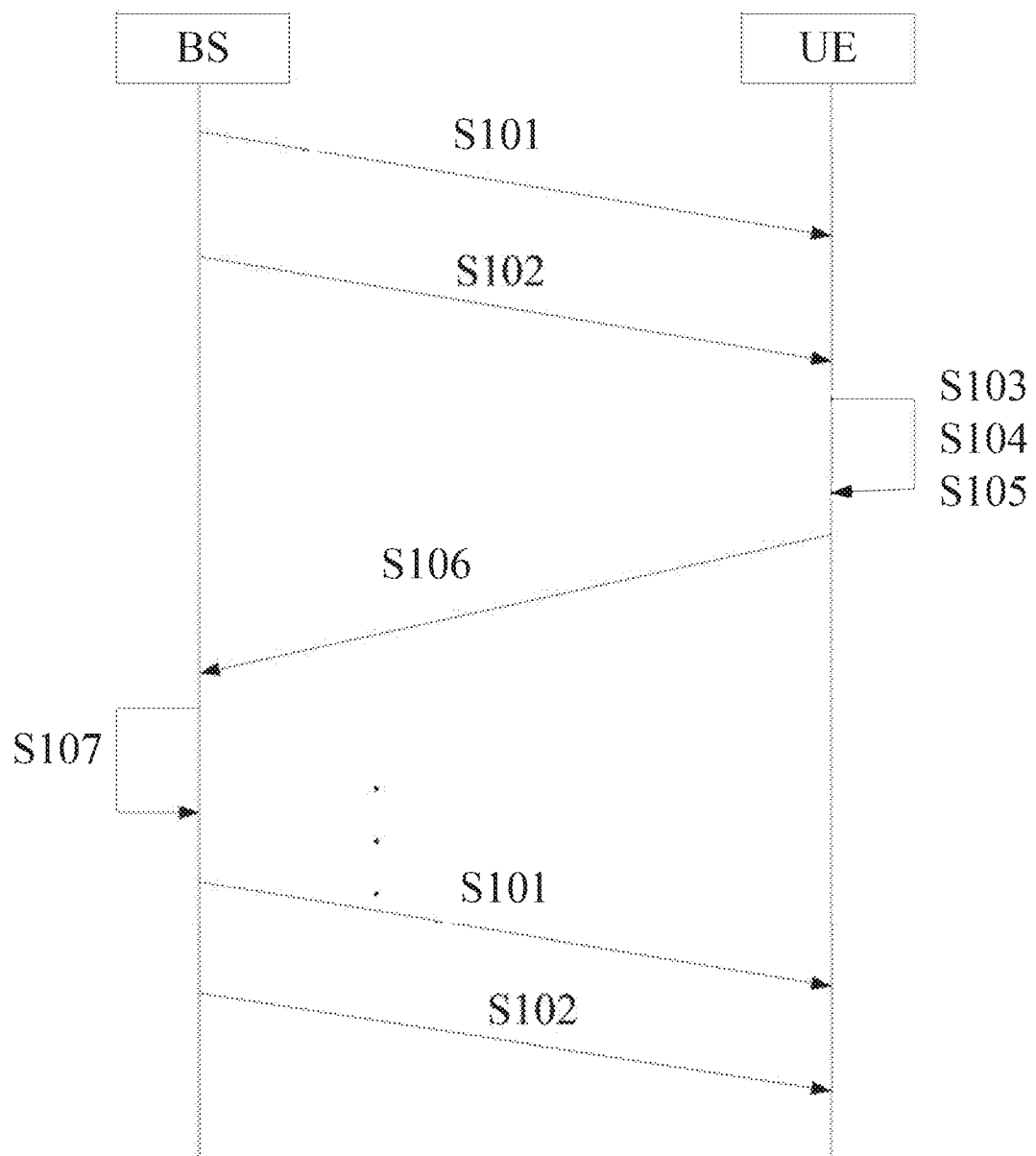
FIG. 1A exemplarily shows a communication sequence between a user terminal and a base station according to embodiments of the present invention.

FIG. 1A exemplarily shows a communication sequence between a user terminal and a base station according to embodiments of the present invention.

As shown in FIG. 1A, in step S101, the base station transmits a downlink control signaling (DCI) to the user terminal, to inform the user terminal of a modulation and coding scheme (MCS1).

Here, the modulation and coding scheme (MCS) includes a combination of a modulation scheme and a coding scheme, each combination corresponding to a different modulation manner, coding manner and coding rate or the like. Naturally, the term is not a limitation, but rather an example. Actually, a request (whatever it is referred to as) to implement a similar function is applicable.

Then, in step S102, the base station transmits downlink data (for example, physical downlink shared channel PDSCH (data)) and a demodulation reference signal (DMRS) to the user terminal via a downlink channel (for example, physical downlink shared channel PDSCH).

The demodulation reference signal DMRS mentioned throughout the specification refers to a type of reference signal used for demodulating data and transmitted in the system. Naturally, the term is not a limitation, but rather an example. Actually, a request (whatever it is referred to as) to implement a similar function is applicable.

In step S103, the user terminal demodulates the physical downlink shared channel PDSCH (data channel) based on the demodulation reference signal (DMRS), and measures (or calculates) a multi-user channel quality indicator (MU-CQI) in step S104, and calculates information related to the MU-CQI (as a receiving signal quality indicator), which is (MU-CQI)-MCS in this example, in step S105.

Here, the multi-user channel quality indicator (MU-CQI) refers to a type of indicator or physical quantity that characterizes the receiving signal quality under multi-user transmission conditions. Naturally, the term is not a limitation, but rather an example. Actually, a request (whatever it is referred to as) to implement a similar function is applicable.

In step S106, the user terminal feeds back to the base station a signal combining a hybrid automatic repeat request (HARQ) feedback signal and the information related to the MU-CQI via a feedback channel.

Here, the so-called hybrid automatic repeat request (HARQ) mentioned throughout the specification may refer to a function of requesting the transmitter to retransmit information when the receiver fails to decode, and of jointly decoding retransmission information and first transmission information. Naturally, the term is not a limitation, but rather an example. Actually, a request (whatever it is referred to as) to implement a similar function is applicable.

In step S107, after receiving the signal combining a response signal (or feedback signal) to the hybrid automatic repeat request (HARQ) and the information related to the MU-CQI, the base station may update CQI information and adjust the MCS2 for the next transmission according to the information related to the MU-CQI in the combined signal (eg, continue steps S101 and S102, or the like).

In this way, the MU-CQI and the information related to the MU-CQI are measured based on the DMRS and the physical downlink shared channel PDSCH, and the information related to the MU-CQI is rapidly fed back to the base station via the HARQ feedback channel. Comparing with delaying the feedback of the information related to the MU-CQI by one single signaling, signaling loads of the MU-CQI feedback can be reduced, and the MU-CQI feedback efficiency can be improved.

Figure 1B:
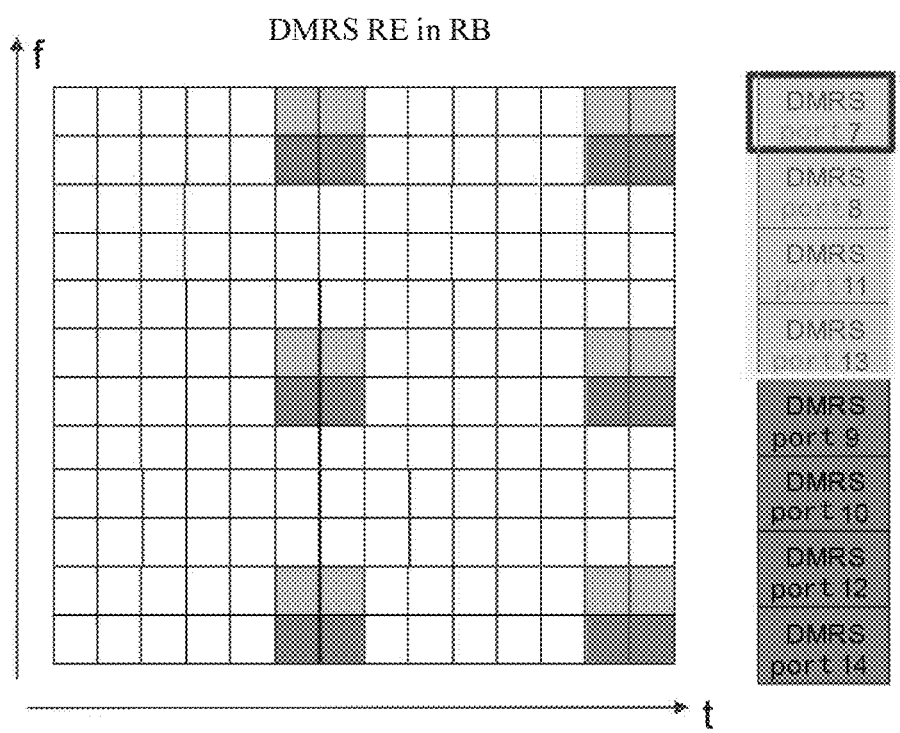
FIG. 1B exemplarily shows resource elements (REs) of a demodulation reference signal (DMRS) in a resource block (RB) and how to calculate a MU-CQI.

FIG. 1B exemplarily shows resource elements (REs) (refers to, for example, one specific time domain and frequency domain resources for transmitting information) of the demodulation reference signal (DMRS) in a resource block (RB) (which refers to, for example, a set of a part of time domain and frequency domain resources) and how to calculate the MU-CQI.

For example, as shown, the data of the UE is transmitted on the DMRS port 7, and the data of other UEs, i.e., multi-user interference (MUI), is transmitted on ports 8, 11 and 13. The UE then decodes the data on port 7 and measures a signal power S on port 7. The UE measures MUI powers on ports 8, 11 and 13. The UE measures an inter-cell interference I and a noise power N by conventional means. Then, the UE calculates the MU-CQI as SINR=S/(MUI+I+N), in which SINR is used to characterize receiving quality, in particular, a type of physical quantity of the ratio of the receiving signal power and the interference and the noise power. Here, the SINR is quantized into a discrete value. In this example, the information related to the MU-CQI (or information related to the receiving signal quality) is calculated as the MU-CQI subtracting the MCS used for the current data transmission, i.e., a bias. Note that an example of MU-CQI subtracting the MCS used for the current data transmission as the bias is given here (the biases in the examples mentioned later are also calculated in the same way). However, the technical solution of the present specification is not limited thereto, and the MCS used for the current data transmission subtracting the MU-CQI as the bias is also available. Naturally, in this example, the MU- CQI adopts the discretized SINR value. However, the technical solution of the present specification is not limited thereto, and a decimal value or an absolute dB value or the like may also be adopted. Moreover, the SINR may not be quantized, and the MCS used for the current data transmission can be converted into SINR2, which subtracts the SINR to obtain a bias in real number form. After the bias in real number form is quantified, the digital modulation and transmission or the analog modulation and transmission by using methods described later can be performed.

Naturally, the above calculation is merely an example, and other methods can also be adopted to calculate the MU-CQI and the information related to the MU-CQI (or information related to the receiving signal quality), for example, any function f(MU-CQI, MCS) of MU-CQI and MCS.

FIG. 2 exemplarily shows a flowchart of a feedback method 200 at the user terminal according to the embodiments of the present invention.

The feedback method 200 at the user terminal as shown in FIG. 2 includes the following steps: in step S201, first information related to the receiving signal quality is calculated (or measured); in step S202, the first information and a response signal to the hybrid automatic repeat request (HARQ) to be transmitted to the base station are combined to generate a combined signal; in step S203, signal processing on the combined signal is performed to generate second information; and in step S204, the second information is transmitted to the base station.

In this way, the MU-CQI and the information related to the MU-CQI are measured based on the DMRS and the physical downlink shared channel PDSCH, and the information related to the MU-CQI is rapidly fed back to the base station via the HARQ feedback channel. Comparing with delaying the feedback of the information related to the MU-CQI by one single signaling, signaling loads of the MU-CQI feedback can be reduced, and the MU-CQI feedback efficiency can be improved.

Here, step S201 may include calculating a bias between a reference value and the multi-user channel quality indicator (MU-CQI) obtained by measuring the demodulation reference signal (DMRS) port transmitted in the downlink channel (for example, the physical downlink shared channel (PDSCH)) and received from the base station, as the first information.

The reference value is the receiving signal quality of the downlink data channel and the reference symbol related to the MCS. In one instance, the reference value can be the modulation and coding scheme (MCS) or other channel quality indicators (CQIs) from the base station.

Here, the channel quality indicator (CQI) is a type of indicator or physical quantity for characterizing the receiving signal quality. Naturally, the term is not a limitation, but rather an example. Actually, a request (whatever it is referred to as) to implement a similar function is applicable.

In one instance, the reference value may be, for example, the channel quality indicator (COI) obtained by the UE measuring on a channel state information reference symbol (CSI-RS) port transmitted in the downlink channel (for example, physical downlink shared channel (PDSCH)) and received from the base station.

Here, the CSI-RS refers to a type of reference signal transmitted in the system and used for measuring the channel state. Naturally, the term is not a limitation, but rather an example. Actually, a request (whatever it is referred to as) to implement a similar function is applicable.

In this way, the bias can be fed back, so as to reduce the amount of data to be fed back and further improve the feedback efficiency. Naturally, the first information related to the receiving signal quality may be the bias, or may also be an initial measurement value, which is not limited herein.

In one embodiment, in step S202, the first information and the response signal to the hybrid automatic repeat request (HARD) to be transmitted to the base station are combined to generate a combined signal. This combination may sequentially arrange or non-sequentially arrange (for example, interleaving, scrambling or the like) bit values obtained after an analog-to-digital conversion is performed on the first information and the response signal, to obtain a combined signal with bit values. In addition, this combination may also be a direct combination of analog values of the first information and the response signal. The combination manner may also be other manners as long as the content of the first information and the response signal can be included.

In one embodiment, the signal processing in step S203 may include at least one of encoding and constellation modulation. The signal processing carried out on the combined signal to generate the second information may include one of the following: encoding the combined signal; carrying out a constellation modulation on the combined signal; encoding a part of the combined signal and carrying out a constellation modulation on other parts of the combined signal. Here, encoding a part of the combined signal and carrying out a constellation modulation on other parts of the combined signal may include, for example, encoding the response signal in the combined signal and carrying out a constellation modulation on the second information in the combined signal, or vice versa.

In one embodiment, the step of carrying out the signal processing on the combined signal to generate the second information may include one of the following: encoding the combined signal such that the second information is represented by one bit; encoding the combined signal such that the second information is represented by a bit string, where the response signal is represented by one bit of the bit string and the first information is represented by other bits of the bit string; encoding the combined signal such that the second information is represented by a bit string, where one value of the bit string is used to represent only one value of the response signal and other values of the bit string are used to represent the first information and other values of the response signal; or encoding the combined signal such that the second information is represented by a bit string, where one value of the bit string corresponds to one value of the combined signal.

These cases are described in detail below with reference to FIGS. 3A-3D.

FIG. 3A exemplarily shows a first exemplary encoding example in the feedback method at the user terminal according to the embodiments of the present invention.

Here, the combined signal are encoded such that the second information is represented by one bit. For example, as shown in FIG. 3A, bit 0 is used to represent the response signal as an acknowledgment ACK and the bias which is 0 or positive (i.e., non-negative bias), and bit 1 is used to represent the response signal as a non-acknowledgment NACK and the bias which is 0 or negative (i.e., a non-positive bias). Naturally, the value of the bit 0 or 1 can also be reversed.

Here, ACK is a type of signal for confirming that the reception is correct. NACK is a type of signal for indicating that the reception, demodulation or decoding is abnormal or incorrect. Naturally, these terms are not limitations, but rather examples. Actually, a request (whatever it is referred to as) to implement a similar function is applicable.

Here, in the case of the ACK response signal, the bias is 0 or positive with a larger probability and is negative with a smaller probability, and in the case of the NACK response signal, the bias is 0 or negative with a larger probability and is positive with a smaller probability, thus, only one bit is used to represent the symbol of the response signal and the corresponding bias (for example, a non-negative or non-positive bias), which can not only save system resources, simplify system design, and reduce data amount of the signal to be transmitted, but also can represent more important or most information of the response signal and the bias.

FIG. 3B exemplarily shows a second exemplary encoding example in the feedback method at the user terminal according to the embodiments of the present invention.

Here, the combined signal are encoded such that the second information is represented by a bit string, wherein the response signal is represented by one bit of the bit string, and the first information is represented by other bits of the bit string. For example, as shown in FIG. 3B, the combined signal are represented by a 3-bit bit string, in which one bit of the first bit represents a response signal. For example, the first bit represents the ACK response signal when being 1, and represents the NACK response signal when being 0. The remaining second and third bits (corresponding to 4 values in total) may represent 4 values of the second information. For example, in the case of ACK, 00 may represent 0, 01 represents +1, 10 represents +2, and 11 represents +3. In the case of NACK, 00 may represent 0, 01 represents −1, 10 represents −2, and 11 represents −3.

In this way, more values of the bias may be represented by more number of bits, so that the bias can be finely reported.

As previously described, in the case of the ACK response signal, the bias is 0 or positive with a larger probability and is negative with a smaller probability, and in the case of the NACK response signal, the bias is 0 or negative with a larger probability and is positive with a smaller probability, thus, the four values of the second and third bits are used to correspond to a plurality of positive bias or a plurality of negative bias of the response. This can improve the utilization of the second and third bits, and can also more finely represent more important or most information of the response signal the bias, while can save system resources, simplify system design, and reduce the data amount of the signal to be transmitted.

FIG. 3C exemplarily shows a third exemplary encoding example in the feedback method at the user terminal according to the embodiments of the present invention.

Here, the combined signal are encoded such that the second information is represented by a bit string, where one value of the bit string is used to represent only one value of the response signal, and other values of the bit string are used to represent the first information and other values of the response signal. For example, as shown in FIG. 3C, only one value of 0000 is used to represent the NACK response signal, and the other values are used to represent the bias from −3 to +4. Considering that in the case of NACK, the channel estimation quality is usually relatively poor, therefore, the MU-CQI bias may not be fed back. In this way, the system resources used for feeding back the MU-CQI bias in the case of NACK can be saved, so that various values (for example, positive, 0, and negative) of the MU-CQI bias can be more finely fed back. Naturally, the fineness and range of the various values of the bias are just examples. Actually, other fineness, for example decimals, or other range of values, for example a range of 0 to a large positive number or 0 to a large negative number is also feasible. The scope is also feasible. For example, +1/−1, or the like, may be an integer difference between the MCS and the MU-CQI after the MCS and the MU-CQI being quantized as integers, and may also represent the difference in decimal units between the MCS and the MU-CQI, such as, +0.5/−0.5, +0.25/−0.25, or the like. Non-uniform mappings where the intermediate intervals are inconsistent can also be used, such as +1 for +0.25 difference, +2 for +1 difference, and +3 for +2 differences, or the like. FIG. 3D exemplarily shows a fourth exemplary encoding example in the feedback method at the user terminal according to the embodiments of the present invention.

Here, the combined signal are encoded such that the second information is represented by a bit string, where one value of the bit string corresponds to one value of the combined signal. For example, as shown in FIG. 3D, a fixed bit is not required to correspond to the response signal, or the bias. Instead, different values of the bit string can be used to correspond (map) to a combination of the response signal and the bias one-to-one. In this way, the mapping relationship can also be designed simply.

That is, after the signal processing, for example, encoding as described above, each value of the combined signal has a one-to-one corresponding mapping relationship with each value of the second information. In one case, the mapping relationship can be fixed. In another case, the mapping relationship may be non-fixed, and may vary with a size of the value of the modulation and coding scheme (MCS), or may vary with the distribution or probability of the first information.

Figures 4, 5A:
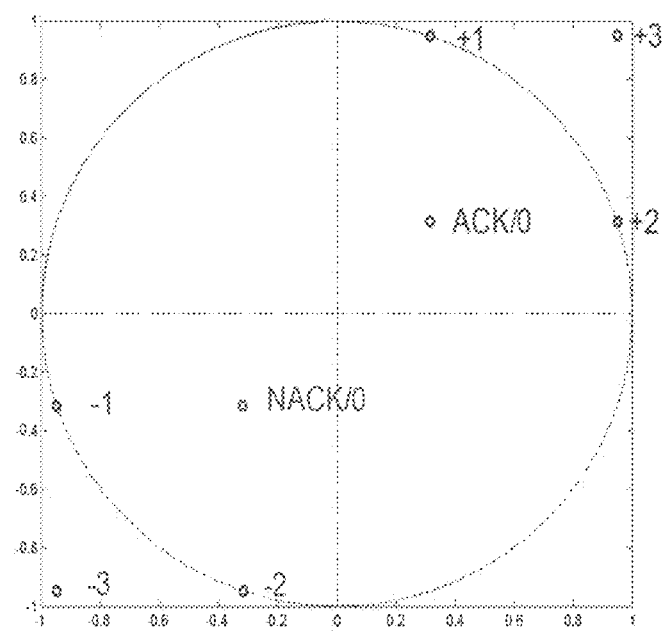
FIG. 4 exemplarily shows an example of a non-fixed mapping relationship in the feedback method at the user terminal according to embodiments of the present invention.
FIG. 5A exemplarily shows a first constellation mapping example in the feedback method at the user terminal according to embodiments of the present invention.

FIG. 4 exemplarily shows an example of a non-fixed mapping relationship in the feedback method at the user terminal according to the embodiments of the present invention.

As shown in FIG. 4, in general cases, for example, here, the combined signal are encoded such that the second information is represented by a (3-bit) bit string, where the response signal ACK or NACK is represented by the first bit of the bit string, and the first information (bias) is represented by other bits of the bit string. For example, in the example as shown in FIG. 3B, a sequence of bits 000-011 represents the NACK and the corresponding MU-CQI bias, while a sequence of bits 100-111 represents the ACK and the corresponding MU-CQI bias.

As shown in the general cases of FIG. 4, the bold 100 and 000 are the zero bias in the case of ACK and the zero bias in the case of NACK. Here, for example, the bias is zero when the absolute value of the MCS of the current transmission is 20 and the absolute value of the fed back MU-CQI is also 20. The bias is 19 minus 20, i.e. equals −1, when the absolute value of the MCS of the current transmission is 20 and the absolute value of the fed back MU-CQI is 19, or the like. At this time, in the case of ACK, the fed back bias vales includes 1 negative value, 1 zero value, and 2 positive values, and in the case of NACK, the fed back bias values includes 1 positive value, 1 zero value, and 2 negative values.

If the absolute value of the MCS is large, for example, it reaches 22 (as shown in a boundary case 1), since it is very close to the higher limit 23 of the boundary, there is hardly any margin to adjust the MCS to the higher limit. Therefore, it does not make much sense to feed back the positive bias. Therefore, the corresponding feedback bit string can be mapped to the down-regulated position, for example, allocating more values of some bit string to feed back the negative bias, and adjusting 111 to map to −2. Therefore, compared to the general cases, in the boundary case 1, the original mapping scheme is changed, and more negative values can be allocated to the ACK, for example, two negative values, one zero value, and one positive value are allocated here. In a boundary case 2, the MCS value reaches 23, there is hardly any positive bias, and there is no margin to adjust the MCS to the higher limit. Therefore, it is not necessary to report the positive bias, and the original mapping scheme can be changed to allocate more negative values to both of the ACK and NACK, for example, three negative values and one zero value are allocated here, for example, adjusting the meanings of 110 and 111 such that they represent −3 and −2, and adjusting the meaning of 001 such that it represents −3. In a boundary case 3, since the MCS is 0, which is at a lower limit of the boundary, there is hardly any negative bias, and there is hardly any margin to adjust the MCS to the lower limit. Therefore, it is not necessary to report the negative bias, and the original mapping scheme can be changed to allocate more positive values to both of the ACK and NACK, for example, three positive values and one zero value are allocated here, for example, adjusting the meanings of the bit strings that are originally corresponded to the bias of −2 and −1.

In this way, by dynamically and adaptively changing the original mapping relationship based on the size of the value of the MCS (for example, whether it reaches the boundary value of the higher or lower limit) or the distribution or probability of the first information of the bias (for example, the probability of the positive value distribution is larger, or the like), the bias with a larger probability can be fed back more finely, and the feedback of the bias with a smaller probability can be reduced, so that the limited system resources can be utilized efficiently in the case of limited number of bits of the bit string, and the feedback efficiency is also improved.

Note that, what is exemplified here is a dynamic mapping scheme that encodes the combined signal including the response signal and the first information into bits (strings), but actually in the case of carrying out other signal processing (for example, signal processing such as constellation mapping as described in detail below) on the combined signal including the response signal and the first information, such dynamic and adaptive mapping relationship changes can also be carried out.

After the above encoding processing for the combined signal including the response signal and the first information is carried out to obtain the second information (for example, the encoded bit string described above), in the channel coding phase, a channel coding manner of the conventional hybrid automatic repeat request mechanism (HARQ) may be used to carry out channel coding for the second information. In another manner, the channel coding for the response signal in the second information may be carried out by using a channel coding manner with an error correction capability higher than a predetermined threshold, and the channel coding for the first information in the second information may be carried out by using a channel coding manner with an error correction capability lower than the predetermined threshold. In another manner, channel coding manner of the conventional hybrid automatic repeat request mechanism (HARQ) may be used to carry out channel coding for the response signal in the second information, while the first information in the second information is repeatedly transmitted. That is, different parts of the second information—the response signal part and the second information part, may be encoded with different channel coding manners, so that applying different channel coding efficiency and error correction capability for different parts of the second information are realized, and the channel coding scheme is more flexible.

An example of encoding the combined signal including the response signal and the first information is exemplarily described above, and an example of carrying out constellation modulation for the combined signal including the response signal and the first information will be described below.

FIG. 5A exemplarily shows a first constellation mapping example in the feedback method at the user terminal according to the embodiments of the present invention.

Here, the constellation modulation is carried out for the combined signal in which the response signal (for example the ACK and NACK) and the first information (for example, the bias) are combined.

As shown in FIG. 5A, assume that the constellation modulation is a 16-quadrature amplitude modulation (16-QAM). However, the constellation modulation scheme is not limited to 16-QAM. Instead, it may be other constellation modulation, for example binary phase shift keying (BPSK), quadrature phase shift keying (QPSK), 32QAM, or the like.

As shown in FIG. 5A, each point of the constellation modulation is, for example, $$\frac{1}{\sqrt{10}}(1+1i), \frac{1}{\sqrt{10}}(1+3i), \frac{1}{\sqrt{10}}(3+1i), \frac{1}{\sqrt{10}}(3+3i),$$

$$\frac{1}{\sqrt{10}}(-1-1i), \frac{1}{\sqrt{10}}(-1-3i), \frac{1}{\sqrt{10}}(-3-1i), \frac{1}{\sqrt{10}}(-3-3i),$$

where four points in the first quadrant of 16QAM are respectively used to represent (map to) the ACK and the bias 0, the ACK and the bias +1, the ACK and the bias +2, the ACK and the bias +3, and four points in the third quadrant of the 16QAM are respectively used to represent (map to) the NACK and the bias 0, the NACK and the bias −1, NACK and the bias −2, the NACK and bias −3.

In this way, with a simple constellation mapping, the two information is fed back for the combined signal in which the response signal and the first information are combined, the system resources are efficiently utilized, and the feedback is carried out in time.

Figure 5B:
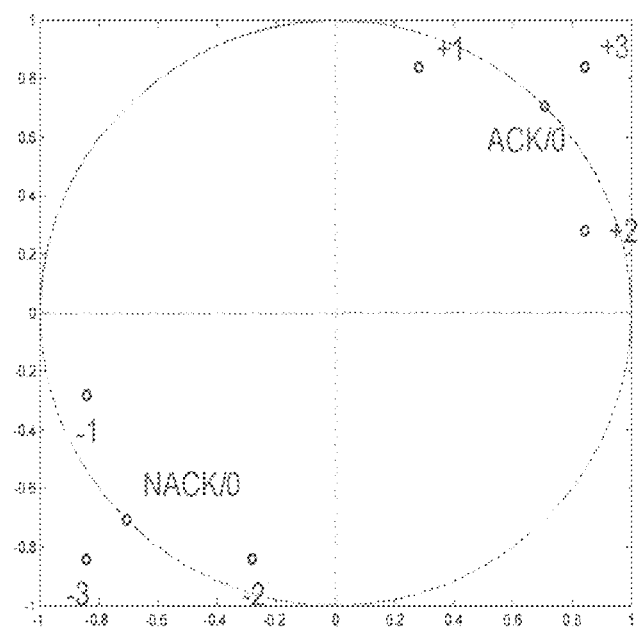
FIG. 5B exemplarily shows a second constellation mapping example in the feedback method at the user terminal according to embodiments of the present invention.

FIG. 5B exemplarily shows a second constellation mapping example in a feedback method at the user terminal according to the embodiments of the present invention.

Here, the constellation modulation is carried out for the combined signal in which the response signal (for example the ACK and NACK) and the first information (for example, the bias) are combined, where a specific constellation modulation is carried out for the response signal, and the specific constellation modulation includes binary phase shift keying or quadrature phase shift keying (BPSK/QPSK) modulation.

As shown in FIG. 5B, the points of the constellation modulation are, for example, $$\frac{1}{\sqrt{2}}(1+1i), \sqrt{\frac{3}{38}}(1+3i), \sqrt{\frac{3}{38}}(3+1i), \sqrt{\frac{3}{38}}(3+3i),$$

$$\frac{1}{\sqrt{2}}(-1-1i), \sqrt{\frac{3}{38}}(-1-3i), \sqrt{\frac{3}{38}}(-3-1i), \sqrt{\frac{3}{38}}(-3-3i),$$

where two points on the BPSK/QPSK constellation mapping are used to represent (map to) the ACK and the bias zero, while the other points on the 16QAM constellation mapping are used to represent (map to) the ACK and the bias +1, the ACK and the bias +2, the ACK and the bias +3, the NACK and bias −1, the NACK and the bias −2, the NACK and the bias −3.

Since the BPSK/QPSK constellation mapping is conventionally used to modulate the response signals of the ACK and NACK, such a design can enable seamless transition to the conventional response signals which only feed the ACK and NACK back without launching the feedback of the bias. In this way, the present embodiment can be seamlessly applied to conventional wireless communication systems, while the cost of modifying the wireless communication systems is saved.

Here, note that the points of the 16QAM constellation shown in FIG. 5B for representing the bias have different positions from the points of the 16QAM in FIG. 5A. This is a design made to satisfy the average symbol power of 1. However, the positions of these points are merely examples and are not limitations, instead, they may also be at any other positions.

Figure 5C:
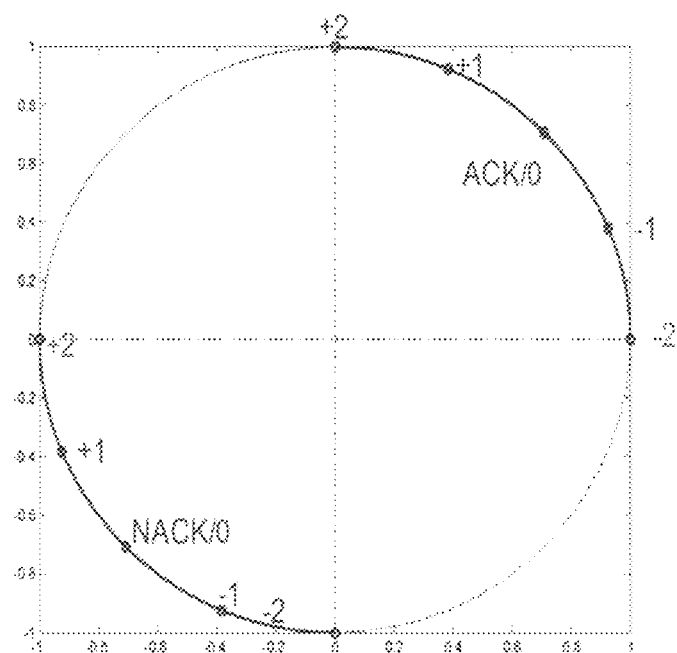
FIG. 5C exemplarily shows a third constellation mapping example in the feedback method at the user terminal according to embodiments of the present invention.

FIG. 5C exemplarily shows a third constellation mapping example in the feedback method at the user terminal according to the embodiments of the present invention.

Here, the constellation modulation is carried out for the combined signal in which the response signal (for example the ACK and NACK) and the first information (for example, the bias) are combined, wherein the combined signal are represented by discrete values on a unit circle of the constellation modulation.

As shown in FIG. 5C, five discrete points on the unit circle of the first quadrant of the constellation are used to represent the ACK and the bias 0, the ACK and the bias −1, −2, +1, +2. Moreover, five discrete points on the unit circle of the third quadrant of the constellation are used to represent the NACK and the bias 0, the NACK and the bias −1, −2, +1, +2.

In this way, it is also possible to control such that the average symbol power is 1. However, the positions of these points are merely examples and are not limitations, and they may also be at any other positions on the unit circle.

FIG. 5D exemplarily shows a fourth constellation mapping example in the feedback method at the user terminal according to the embodiments of the present invention.

Here, the constellation modulation is carried out for the combined signal in which the response signal (for example the ACK and NACK) and the first information (for example, the bias) are combined, where the combined signal are represented by analog values on the unit circle of the constellation modulation.

Here, as shown in FIG. 5D, the point of the ACK and the bias 0 and the point of the NACK and the bias 0 are fixed on the unit circle, that is, they may be at any positions in the opposite directions of the circle (the points may not necessarily be discrete points, instead, they may be on a continuous line), respectively representing (mapping to) the values of the combined signal of the ACK and NACK as well as each bias.

For example, when the HARQ feedback is the ACK, the MU-CQI bias from 0 to +2 may be continuously mapped to the points on the unit circle with phases from pi/4 to pi/2, and the MU-CQI bias from 0 to −2 may be continuously mapped to the points on the unit circle with phases from pi/4 to 0. When the HARQ feedback is the NACK, the MU-CQI bias from 0 to +2 can be continuously mapped to the points on the unit circle with phases from −3 pi/4 to −pi, and the MU-CQI bias from 0 to −2 may be continuously mapped to the points on the unit circle with phases from −3 pi/4 to −pi/2.

In this way, the distribution of the constellation modulation used to represent the combined signal in which the response signal (for example the ACK and NACK) and the first information (for example, the bias) are combined can be more flexibly arranged.

FIG. 6 exemplarily shows an example of the channel coding after the constellation modulation in the feedback method at the user terminal according to the embodiments of the present invention.

Here, after the constellation mapping is carried out, the second information may be repeatedly transmitted, where the phases of the constellation modulation for the second information transmitted repeatedly each time are different from each other.

As shown in FIG. 6, when the second information is transmitted for the first time, the phases of the constellation modulation are, for example, 0 and 180 degrees. When the second information is transmitted for the second time, the phases of the constellation modulation are, for example, 90 and 270 degrees. When the second information is transmitted for the third time, the phases of the constellation modulation are, for example, 180 and 0 degrees. That is, the phase for each transmission is offset by an offset of pi/4.

Naturally, the offset pi/4 of the phase described above is merely an example, rather than a limitation.

The peak power ratio of the transmitted signal can be average by making the phases of the constellation modulation of the second information transmitted repeatedly each time different from each other.

In one embodiment, the first information may be obtained by measuring the demodulation reference signal (DMRS) port transmitted in the downlink channel (for example, a physical downlink shared channel (PDSCH)) and received from the base station.

In one embodiment, whether to carry out the step of the combining the first information and the response signal to the hybrid automatic repeat request (HARQ) to be transmitted to the base station to generate the combined signal and the step of the carrying out signal processing on the combined signal to generate the second information or not can be controlled by a radio resource control (RRC) signaling or the downlink control information (DCI) signaling from the base station. That is, whether or not the improved HARQ feedback methods of the various embodiments of the present invention are carried out may be controlled by the RRC or DCI signaling from the base station.

Here, the radio resource control (RRC) signaling refers to a type of signaling sent to the user by a higher layer of the base station protocol stack, such as a radio resource control layer. The downlink control information (DCI) refers to a type of control signaling sent to the user by a lower layer of the base station protocol stack, such as a physical layer and a medium access control layer. Naturally, these terms are not limitations, but rather examples. Actually, a request (whatever it is referred to as) to implement a similar function is applicable.

In this way, the MU-CQI and the information related to the MU-CQI are measured based on the DMRS and the physical downlink shared channel PDSCH, and the information related to the MU-CQI is rapidly fed back to the base station via the HARQ feedback channel. Comparing with delaying the feedback of the information related to the MU-CQI by one single signaling, signaling loads of the MU-CQI feedback can be reduced, and the MU-CQI feedback efficiency can be improved.

Naturally, all the above described embodiments have discussed that when feeding back from the user terminal to the base station, the MCS of the next transmission may be adjusted by the information related to the receiving signal quality and transmitted together with the HARQ response signal. However, the present invention may also be extended as follows: when the base station feeds back the HARQ response signal to the user terminal, the base station may combine the HARQ response signal with the channel quality indicator (CQI) adjustment information, and transmit it to the user terminal for directly adjusting the modulation and coding scheme (MCS) adopted by the user terminal for the next transmission or retransmission.

FIG. 7 exemplarily shows a flowchart of a method 700 at the base station according to the embodiments of the present invention.

As shown in FIG. 7, the method 700 at the base station includes: step S701, receiving second information from the user terminal, where the second information is obtained by carrying out the following steps at the user terminal: calculating first information related to receiving signal quality; combining the first information with a response signal to a hybrid automatic repeat request (HARQ) to be received from the user terminal, to generate a combined signal; carrying out a signal processing on the combined signal to generate the second information.

In one embodiment, a bias between a reference value and the multi-user channel quality indicator (MU-CQI) obtained by measuring the demodulation reference signal (DMRS) port transmitted in the downlink channel (for example, a physical downlink shared channel (PDSCH)) and received from the base station is calculated as the first information.

In one embodiment, the reference value is the receiving signal quality of the downlink data channel and the reference symbol related to the MCS.

In one embodiment, the reference value may include the modulation and coding scheme (MCS) from the base station or other channel quality indicator (CQI).

In one embodiment, the other channel quality indicator (CQI) may include the channel quality indicator (CQI) obtained by measuring the channel state information reference symbol (CSI-RS) port transmitted in the downlink channel (for example, physical downlink shared channel (PDSCH)) and received from the base station.

In one embodiment, the signal processing may include at least one of encoding and constellation modulation, where carrying out signal processing on the combined signal to generate the second information includes one of the following: encoding the combined signal; carrying out constellation modulation for the combined signal; encoding a part of the combined signal and carrying out constellation modulation for other parts of the combined signal.

In one embodiment, the step of carrying out the signal processing on the combined signal to generate the second information may include one of the following: encoding the combined signal such that the second information is represented by one bit; encoding the combined signal such that the second information is represented by a bit string, where the response signal is represented by one bit of the bit string, and the first information is represented by other bits of the bit string; encoding the combined signal such that the second information is represented by a bit string, where one value of the bit string is used to represent only one value of the response signal, and other values of the bit string are used to represent the first information and other values of the response signal; or encoding the combined signal such that the second information is represented by a bit string, where one value of the bit string corresponds to one value of the combined signal.

In one embodiment, in the case where the second information is represented by one bit, the second information of the response signal to the acknowledgement (ACK) and the non-negative bias may be represented by one value of one bit, and the second information of the response signal to the non-acknowledgement (NACK) and the non-positive bias may be represented by another value of the one bit. In the case where the second information is represented by the bit string, where one value of the bit string is used to represent only one value of the response signal. Moreover, in the case where the other values of the bit string are used to represent the first information and the other values of the response signal, the response signal to the non-acknowledgement (NACK) may be represented by one value of the bit string, and the first information and the response signal to the acknowledgement (ACK) may be represented by the other values of the bit string.

In one embodiment, channel coding may be carried out for the second information through one of the following channel coding manners: carrying out channel coding for the second information by using the channel coding manner of the hybrid automatic repeat request (HARQ) mechanism; carrying out channel coding for the response signal in the second information by using the channel coding manner with an error correction capability higher than the predetermined threshold, and carrying out channel coding for the first information in the second information using the channel coding manner with an error correction capability lower than the predetermined threshold; or carrying out channel coding for the response signal in the second information by using the channel coding manner of the hybrid automatic repeat request (HARQ) mechanism, while the first information in the second information is repeatedly transmitted.

In one embodiment, the step of carrying out signal processing on the combined signal to generate the second information may include one of the following: carrying out constellation modulation for the combined signal; carrying out constellation modulation for the combined signal, where a specific constellation modulation is carried out for the response signal, and the specific constellation modulation includes binary phase shift keying or quadrature phase shift keying (BPSK/QPSK) modulation; or carrying out constellation modulation for the combined signal, where the combined signal are represented by discrete values on the unit circle of the constellation modulation; carrying out constellation modulation for the combined signal, where the combined signal are represented by the analog values on the unit circle of the constellation modulation.

In one embodiment, the received second information may be repeatedly transmitted, where the phases of the constellation modulation of the second information transmitted repeatedly each time are different from each other.

In one embodiment, each value of the combined signal has a mapping relationship with each value of the second information, where the mapping relationship is fixed; or the mapping relationship is not fixed and varies with the size of the value of the modulation and coding scheme (MCS) or varies with the distribution or probability of the first information.

In one embodiment, the first information may be obtained by measuring the demodulation reference signal (DMRS)

port transmitted in the downlink channel (for example, a physical downlink shared channel (PDSCH)) and received at the base station.

In one embodiment, whether to carry out the step of the combining the first information and the response signal to the hybrid automatic repeat request (HARQ) to be transmitted to the base station to generate the combined signal and the step of the carrying out signal processing on the combined signal to generate the second information or not can be controlled by a radio resource control (RRC) signaling or a downlink control information (DCI) signaling transmitted by the base station.

In this way, the MU-CQI and the information related to the MU-CQI are measured based on the DMRS and the physical downlink shared channel PDSCH, and the information related to the MU-CQI is rapidly fed back to the base station via the HARQ feedback channel. Comparing with delaying the feedback of the information related to the MU-CQI by one single signaling, signaling loads of the MU-CQI feedback can be reduced, and the MU-CQI feedback efficiency can be improved.

Naturally, the specific embodiments described above are merely examples and are not limitations, and those skilled in the art can merge and combine some steps and apparatuses from respective embodiments that are separately described above according to the conception of the present invention, to implement the effects of the present invention. The merged and combined embodiments are also included in the present invention, and such merging and combination are not described respectively herein.

It should be noted that block diagrams used for the illustration of the above embodiments represent functional blocks in functional units. These functional blocks (components) are realized by any combination of hardware and/or software. In addition, the means for implementing respective function blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 8:
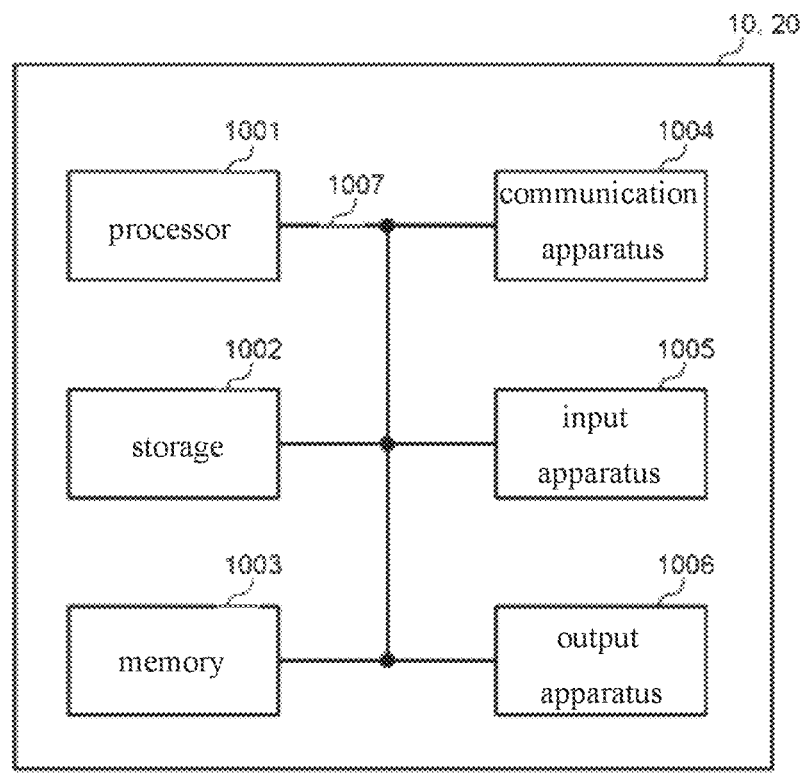
FIG. 8 is a diagram representing an example of a hardware configuration of a radio base station and a user terminal according to one implementation of the present invention.

For example, the wireless base station, the user terminal or the like in one implementation of the present invention can function as a computer that carries out the processes of the wireless communication method of the present invention. FIG. 8 is a diagram that shows an example of a hardware structure of the wireless base station and the user terminal in one implementation of the present invention. The above described wireless base station 10 and the user terminal 20 may be physically designed as a computer apparatus including a processor 1001, a storage 1002, a memory 1003, a communication apparatus 1004, an input apparatus 1005, an output apparatus 1006, and a bus 1007 and the like.

In the case where the hardware structure as shown in FIG. 8 is the hardware structure of the user terminal 20, the user terminal 20 includes: the communication apparatus 1004 configured to transmit and receive signals with the base station; the processor 1001 configured to calculate the first information related to the receiving signal quality, combine the first information and the response signal to the hybrid automatic repeat request (HARQ) to be transmitted to the base station to generate the combined signal, and carry out signal processing on the combined signal to generate the second information; and the communication apparatus 1004 configured to transmit the second information to the base station.

The processor 1001 and the communication apparatus 1004 may also realize respective steps of the method at the user terminal as described above, which will not be described herein.

Moreover, in the case where the hardware structure as shown in FIG. 8 is the hardware structure of the base station 10, the base station 10 includes: the communication apparatus 1004 configured to receive the second information from the user terminal, wherein the second information is obtained by carrying out the following steps at the user terminal: calculating the first information related to the receiving signal quality; combining the first information with the response signal to the hybrid automatic repeat request (HARQ) to be received from the user terminal to generate the combined signal; carrying out signal processing on the combined signal to generate the second information.

Naturally, other apparatuses in the hardware structures 10 and 20, for example, the storage, the input apparatus, the memory, the output apparatus and the like can play an auxiliary role and are not limitative.

It should be noted that in the following description, the term "apparatus" can be interpreted as a circuit, a device, a unit or the like. The hardware structure of the wireless base station 10 and the user terminal 20 may be designed in a manner that one or more respective apparatuses shown in the figure are included, or may be designed not to include a part of the apparatuses.

The respective functions related to the wireless base station 10 and the user terminal 20 are realized by reading a specified software (program) on the hardware such as the processor 1001 and the storage 1002, the processor 1001 carrying out calculations, and by controlling the communication carried out by the communication apparatus 1004 and the reading and/or writing of data in the storage 1002 and the memory 1003.

The processor 1001 operates, for example, on an operating system to control the entire computer. The processor 1001 may be composed of a central processing unit (CPU) including interfaces with peripheral apparatuses, control apparatuses, computing apparatuses, registers, and the like. For example, the above described baseband signal processing unit 104, the call processing unit 105, or the like may be realized by the processor 1001.

In addition, the processor 1001 reads programs (program codes), software modules, and data from the memory 1003 and/or the communication apparatus 1004 into the storage 1002, and performs various processes according to the contents thereof. As the programs, the programs that cause the computer to perform at least a part of the operations described in the above embodiments are used. For example, the control unit 401 of the user terminal 20 is stored in the storage 1002, and can be realized by control programs that are executed in the processor 1001, and other functional blocks may be realized likewise. The above various processes are described with the subject matter of performing in one processor 1001, however, may also be performed simultaneously or sequentially by two or more processors 1001. The processor 1001 may be realized by more than one chip. It should be noted that the programs can be transmitted from the network via a communication circuit.

The storage 1002 is a computer-readable recording medium readable, and for example may be composed of at least one of a ROM (Read Only Memory), an EPROM (Erasable Programmable ROM), an EEPROM (Electrically Erasable Programmable ROM), a RAM (Random Access Memory) or the like. The storage 1002 may be referred to as a register, a cache memory, a main storage (a primary storage apparatus), or the like. The storage 1002 can store executable programs (program codes), software modules, or the like, for implementing the wireless communication methods of one implementation of the present invention.

The memory 1003 is a computer-readable recording medium, and for example may be composed of by at least one of a compact disc such as a CD-ROM or the like, a hard disk driver, a floppy magnetic disk, a magneto-optical disk (for example, a compressed compact disk, a digital versatile disk, a Blu-ray (registered trademark) disk), a smart card, a flash memory (such as a flash memory card, a flash memory stick, a thin flash memory), a floppy disk (floppy disk registered trademark), and a magnetic stripe, or the like. The memory 1003 may be referred to as an auxiliary storage apparatus. The above storage medium may be, for example, other suitable media such as databases, servers, or the like, including the storage 1002 and/or the memory 1003.

The communication apparatus 1004 is hardware (a transmitting/receiving device) that carries out communication among the computers via wired and/or wireless networks, and is also referred to as, for example, a network device, a network controller, a network card, a communication module, or the like. For example, the above described transmitting/receiving antenna 101, the amplifying unit 102, the transmitting/receiving unit 103, and the transmission path interface 106, or the like, may be realized by the communication apparatus 1004.

The input apparatus 1005 is an input device (for example, a keyboard, a mouse, a microphone, a switch, a button, a sensor, or the like) that receives inputs from the outside. The output apparatus 1006 is an output device (for example, a display, a speaker, an LED light, or the like) that performs outputs to the outside. It should be noted that the input apparatus 1005 and the output apparatus 1006 may be provided in an integrated structure (for example, a touch screen).

In addition, the respective apparatuses such as the processor 1001 and the storage 1002 are connected by the bus 1007 via which information is communicated. The bus 1007 may be composed of a single bus or different buses among apparatuses.

In addition, the wireless base station 10 and the user terminal 20 may be designed to include hardware such as a microprocessor, a digital signal processor (DSP), an ASIC (Application Specific Integrated Circuit), a PLD (Programmable Logic Device), a FPGA (Field Programmable Gate Array), or the like, and some or all of the functional blocks may be realized by the hardware. For example, the processor 1001 may be realized by at least one of these pieces of hardware.

The notification of the information is not limited to the manner/implementation illustrated in the present specification, and may be carried out by other methods. For example, the notification of the information may be realized by physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block))), other signals, or a combination of these. In addition, the RRC signaling may also be referred to as an RRC message, for example, an RRC connection setup message, an RRC connection reconfiguration message, or the like.

The respective manners/implementations illustrated in the present specification may be applied to LTE (long term evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra-Mobile Broadband), IEEE 802.11 (Wi-Fi), IEEE 802.16 (WiMAX), IEEE 802.20, UWB (Ultra-WideBand), Bluetooth (registered trademark), systems that utilize other suitable systems, and/or next-generation systems that are enhanced based on these.

The order of the processing steps, sequences, and flowcharts, or the like, of the respective manners/implementations illustrated in the present specification may be re-ordered as long as inconsistencies do not arise. For example, although the methods illustrated in the present specification prompt elements of the respective steps in exemplary orders, it is not limited to the prompted specific orders.

Certain actions performed by the base station in the present specification are, in some cases, performed by its upper nodes due to circumstances. In a network composed of one or more network nodes having base stations, it is clear that various operations for communication with terminals can be performed by base stations and/or other network nodes other than base stations (for example, an MME or an S-GW, or the like, but it is not limited to these). Although the above exemplifies the case where the number of the other network nodes other than base stations is one, the other network nodes other than base stations may be a combination of a plurality of other network nodes (for example, the MME and the S-GW).

Information (see the item reference of "information, signal") can be output from higher layers to lower layers or from lower layers to higher layers. The input and output can be performed via a plurality of network nodes.

The input and output information, or the like, may be stored in a specific location (such as a storage) or may be managed by a management table. The input and output information, or the like, may be overwritten, updated, or appended. The output information or the like may be deleted. The input information or the like may be transmitted to other apparatuses.

Determinations may be made with the values (0 or 1) represented by one bit, or may be made by a true or false value, or may be made by comparison of values (for example, comparison with a specified value).

The respective manners/implementations illustrated in the present specification may be used individually or in combination, or may be switched with execution. In addition, the notification of specified information (for example, the notification being "X") is not limited to being performed explicitly, and may also be performed implicitly (for example, without the notification of the specified information).

The present invention has been described in detail above, but it is obvious to those skilled in the art that the present invention is not limited to the implementations illustrated in the specification. The present invention can be implemented with corrections and modifications without departing from the spirit and scope of the present invention defined by the disclosure of the claims. Consequently, the disclosure of the present specification is provided only for the purpose of illustrating examples, and is not intended to limit the present invention in any way.

Software is independent of being referred to as software, firmware, middleware, microcode, hardware description language, or being referred to as other names, and may be broadly interpreted as instructions, instruction sets, codes, code segments, program code, programs, subroutines, software modules, applications, software applications, software packages, routines, subroutines, objects, executables, threads of execution, steps, functions, or the like.

In addition, software, instructions, or the like may be transmitted/received via a transmission medium. For example, in the case where the software is transmitted from web pages, servers, or other remote data sources by using wired technologies such as a coaxial cable, a fiber, a twisted pair, and a digital subscriber line (DSL) and/or wireless technologies such as infrared, wireless and microwave, these wired technologies and/or wireless technologies are included in the definition of the transmission medium.

The information, signals, or the like, illustrated in the present specification may be represented by using a variety of different technologies. For example, data, instructions, commands, information, signals, bits, symbols, chips, or the like, involved throughout the description above may be represented by voltages, currents, electromagnetic waves, magnetic fields or magnetic particles, light fields or photons, or any combination of these.

It should be noted that the terms illustrated in the present specification and/or the terms required for the understanding of the present specification may be substituted with terms having the same or similar meaning. For example, a channel and/or a symbol may be a signal. In addition, the signal may be a message. In addition, a component carrier (CC) may be referred to as a carrier frequency, a cell, or the like.

The terms "system" and "network" used in the present specification are used interchangeably.

In addition, the information, parameters, or the like, illustrated in the present specification may be represented in absolute values, or in relative values of specified values, or may also be represented by corresponding other information. For example, wireless resources may be indicated by indexes.

The names used for the above parameters are not limited at any time. Moreover, the equations using these parameters or the like are, at some cases, different from those explicitly disclosed in the present specification. Various channels (for example, PUCCH, PDCCH, or the like) and information elements (for example, TPC or the like) may be identified with any suitable names, thus, the various names allocated to the various channels and information elements are not limited at any time.

The base station can accommodate one or more (for example, three) cells (also referred to as sectors). In the case where the base station accommodates a plurality of cells, the entire coverage area of the base station may be divided into a plurality of smaller areas, each of which may utilize a base station subsystem (for example, a small base station for indoor use: Remote Radio Head (RRH)) to provide communication services. The terms "cell" or "sector" refer to a part or all of the coverage area of the base station and/or the base station subsystem that provides communication services within the coverage area. Moreover, the terms "base station", "eNB", "cell" and "sector" can be used interchangeably in the present specification. The base station is sometimes also referred to as a fixed station, a NodeB, an eNodeB (eNB), an access point, a femto cell, a small cell, or the like.

The name of a mobile station varies from those skilled in the art. A mobile station may is sometimes referred to as a user station, a mobile unit, a user unit, a wireless unit, a remote unit, a mobile device, a wireless device, a wireless communication device, a remote device, a mobile user station, a access terminal, a mobile terminal, a wireless terminal, a remote terminal, a handheld device, a user agent, a mobile client, a client, or other suitable terms.

Note that the merits, advantages, effects, or the like mentioned in the present disclosure are merely examples and are not limitations. These merits, advantages, effects, or the like cannot be considered essential for the various embodiments of the present invention. In addition, the specific details disclosed above are merely for the purpose of examples and for the purpose of a better understanding, and are not limitations. The above details do not limit the present invention to be implemented by necessarily using the above specific details.

The block diagrams of the components, apparatuses, devices, systems involved in the present disclosure merely serve as exemplary examples and are not intended to require or suggest that they must be connected, arranged, and configured in the manner shown in the block diagrams. As will be appreciated by those skilled in the art, these components, apparatuses, devices and systems may be connected, arranged, and configured in any manner. The terms such as, "comprising", "including", "having", or the like, are open words that refer to "including but not limited to", and may be used interchangeably. The terms "or" and "and" used herein refer to the term "and/or", and may be used interchangeably unless the context explicitly indicates otherwise. The term "such as" used herein refers to a phrase "such as but not limited to", and may be used interchangeably.

The flowcharts of the steps in the present disclosure and the above description of the methods are merely exemplary examples and are not intended to require or suggest that the steps of the various embodiments must be performed in a given order. As will be appreciated by those skilled in the art, the steps in the above embodiments may be performed in any order. The terms such as "thereafter", "then", "next", or the like are not intended to limit the order of the steps. These terms are only used to guide the reader through the description of the methods. In addition, for example, any reference to a singular element by using the article "a", "an" or "the" should not be construed as limiting the element to be singular.

In addition, the steps and apparatuses in the various embodiments herein are not limited to the implementation in a certain embodiment. Actually, new embodiments may be contemplated by combining a part of the related steps and a part of apparatuses in the various embodiments herein according to the concept of the present invention, and these new embodiments are also included in the scope of the present invention.

The methods disclosed herein include one or more actions for implementing the described methods. The methods and/or actions may be interchanged with each out without departing from the scope of the claims. In other words, unless the specific order of the actions has been specified, the order and/or use of the specific actions may be modified without departing from the scope of the claims.

Other examples and implementations are within the scope and spirit of the present disclosure and the appended claims. For example, due to the nature of the software, the functions described above may be realized by using software executed by a processor, hardware, firmware, hardwire, or any combination of these. Features that implement the functions may also be physically located at various locations. Moreover, the features can be distributed so that parts of the functions are implemented at different physical locations. Moreover, as used herein and used in the claims, the usage of "or" in an enumeration of an item that begins with "at least one" indicates a separate enumeration, so that the enumeration such as "at least one of A, B or C" means A or B or C, or AB or AC or BC, or ABC (i.e., A and B and C). Moreover, the wording "exemplary" does not mean that the described examples are preferred or better than other examples.

Various changes, replacements and modifications on the techniques described herein may be made without departing from the techniques of the teaching defined by the appended claims. Furthermore, the scope of the claims of the present disclosure is not limited to the specific aspects of the processing, machinery, manufacturing, composition of events, means, methods and actions as described above. The functions with substantially the same respective aspects as described herein and the presently existing or later developed processing, machinery, manufacturing, composition of events, means, methods or actions that achieve substantially the same results may be utilized. Therefore, the appended claims include such processing, machinery, manufacturing, composition of events, means, methods or actions within its scope.

The above description of the provided aspects of the disclosure enables any one skilled in the art realize or use the present invention. Various modifications on these aspects are obvious to those skilled in the art, and the general principles defined herein may be applied to other aspects without departing from the scope of the present invention. Therefore, the present invention is not intended to be limited to the aspects shown herein, but rather the broadest scope consistent with the principles and novel features disclosed herein.

The foregoing description has been presented for purposes of illustration and description. Furthermore, the description is not intended to limit the embodiments of the present invention to the forms disclosed herein. Although a number of exemplary aspects and embodiments have been discussed above, those skilled in the art will recognize certain variations, modifications, changes, additions and sub-combinations thereof.

What is claimed is:

1. A user terminal, comprising:
a communication apparatus configured to transmit and receive signals with a base station;
a processor configured to
calculate first information related to receiving signal quality;
combine the first information and a response signal to a hybrid automatic repeat request (HARQ) to be transmitted to a base station to generate a combined signal; and
carry out signal processing on the combined signal to generate second information; and
a communication apparatus configured to transmit the second information to the base station,
wherein the processor is configured to calculate a bias between a reference value and a multi-user channel quality indicator (MU-CQI) obtained by measuring a reference signal port transmitted in a downlink channel and received from the base station, as the first information, wherein the reference value is receiving signal quality of a downlink data channel and a reference symbol related to a modulation and coding scheme.

2. A method at a base station, comprising steps of:
receiving second information from a user terminal, wherein the second information is obtained by carrying out the following steps at the user terminal:
calculating first information related to receiving signal quality;
combining the first information and a response signal to a hybrid automatic repeat request (HARQ) to be received from the user terminal to generate a combined signal;
carrying out signal processing on the combined signal to generate the second information,
wherein a bias is calculated between a reference value and a multi-user channel quality indicator (MU-CQI) obtained by measuring a reference signal port transmitted in a downlink channel and received from the base station, as the first information, wherein the reference value is receiving signal quality of a downlink data channel and a reference symbol related to a modulation and coding scheme.

3. A base station, comprising:
a communication apparatus configured to receive second information from a user terminal, wherein the second information is obtained by carrying out the following steps at the user terminal:
calculating first information related to receiving signal quality;
combining the first information with a response signal to a hybrid automatic repeat request (HARQ) to be received from the user terminal to generate a combined signal;
carrying out signal processing on the combined signal to generate the second information,
wherein a bias is calculated between a reference value and a multi-user channel quality indicator (MU-CQI) obtained by measuring a reference signal port transmitted in a downlink channel and received from the base station, as the first information, wherein the reference value is receiving signal quality of a downlink data channel and a reference symbol related to a modulation and coding scheme.

4. The user terminal of claim 1, wherein
the reference value includes a modulation and coding scheme (MCS) or other channel quality indicators (CQIs) from the base station.

5. The user terminal of claim 4 wherein the other channel quality indicators (CQIs) includes a channel quality indicator (CQI) obtained by measuring a channel state information reference symbol (CSI-RS) port transmitted in the downlink channel and received from the base station.

6. The user terminal of claim 1, wherein the processor is configured to:
encode the combined signal; or
carry out constellation modulation on the combined signal; or
encode a part of the combined signal and carrying out constellation modulation on other parts of the combined signal.

7. The user terminal of claim 1, wherein the processor is configured to:
encode the combined signal such that the second information is represented by one bit; or
encode the combined signal such that the second information is represented by a bit string, wherein the response signal is represented by one bit of the bit string, and the first information is represented by other bits of the bit string; or
encode the combined signal such that the second information is represented by a bit string, wherein one value of the bit string is used to represent only one value of the response signal, and other values of the bit string are used to represent the first information and other values of the response signal; or
encode the combined signal such that the second information is represented by a bit string, wherein one value of the bit string corresponds to one value of the combined signal.

8. The user terminal of claim 7, wherein,
in the case where the second information is represented by one bit, the second information of a response signal to an acknowledgement (ACK) and a non-negative bias are represented by one value of one bit, and the second information of a response signal to a non-acknowledgement (NACK) and a non-positive bias are represented by another value of the one bit;
in the case where the second information is represented by a bit string, wherein one value of the bit string is used to represent only one value of the response signal, and in the case where other values of the bit string are used to represent the first information and other values of the response signal, the response signal to the non-acknowledgement (NACK) is represented by one value of the bit string, and the first information and the response signal to the acknowledgement (ACK) are represented by other values of the bit string.

9. The user terminal of claim 7, wherein the processor is configured to:
carry out channel coding on the second information by using a channel coding manner of the hybrid automatic repeat request (HARQ) mechanism;
carry out channel coding on the response signal in the second information by using a channel coding manner with an error correction capability higher than a predetermined threshold, and carrying out channel coding on the first information in the second information by using a channel coding manner with an error correction capability lower than the predetermined threshold; or
carry out channel coding on the response signal in the second information by using a channel coding manner of the hybrid automatic repeat request (HARQ) mechanism, while repeatedly transmitting the first information in the second information.

10. The user terminal of claim 1, wherein the processor is configured to:
carry out constellation modulation on the combined signal;
carry out constellation modulation on the combined signal, wherein a specific constellation modulation is carried out on the response signal, and the specific constellation modulation includes binary phase shift keying or quadrature phase shift keying (BPSK/QPSK) modulation;
carry out constellation modulation on the combined signal, wherein the combined signal is represented by discrete values on a unit circle of the constellation modulation; or
carry out constellation modulation on the combined signal, wherein the combined signal is represented by analog values on a unit circle of the constellation modulation.

11. The user terminal of claim 1, wherein the communication apparatus is configured to:
repeatedly transmit the second information, wherein the phases of the constellation modulation of the second information transmitted repeatedly each time are different from each other.

12. The user terminal of claim 1,
wherein each value of the combined signal has a mapping relationship with each value of the second information, and
wherein the mapping relationship is fixed; or
the mapping relationship is not fixed and varies with a size of the value of the modulation and coding scheme (MCS) or varies with a distribution or probability of the first information.

13. The user terminal of claim 1, wherein whether to carry out the step of the combining the first information and a response signal to a hybrid automatic repeat request (HARD) to be transmitted to the base station to generate a combined signal and the step of the carrying out signal processing on the combined signal to generate second information or not is controlled by a radio resource control (RRC) signaling or a downlink control information (DCI) signaling from the base station.

* * * * *